United States Patent Office 3,534,157
Patented Oct. 13, 1970

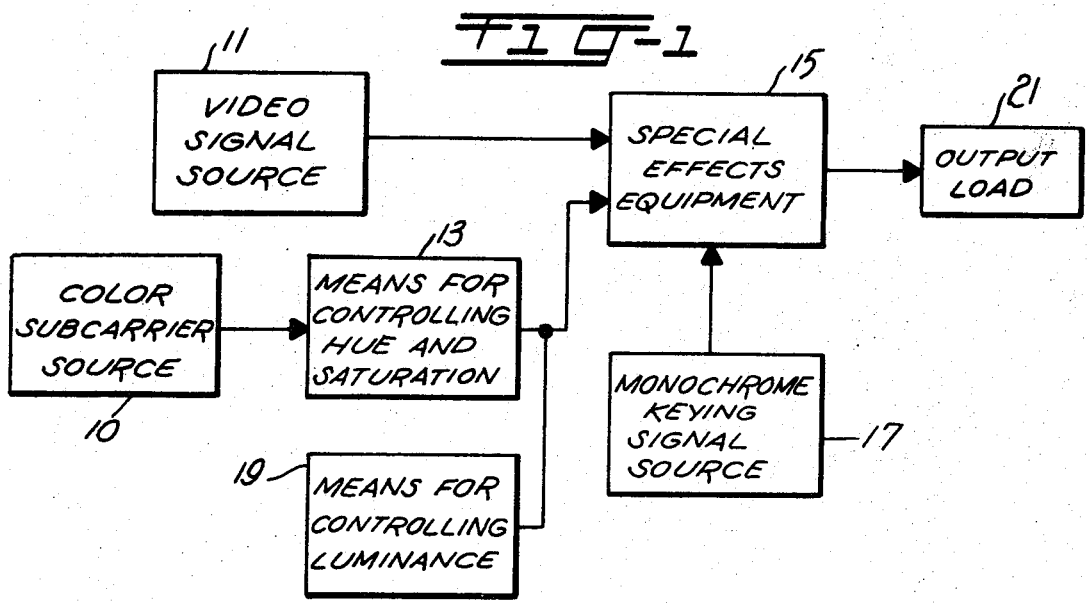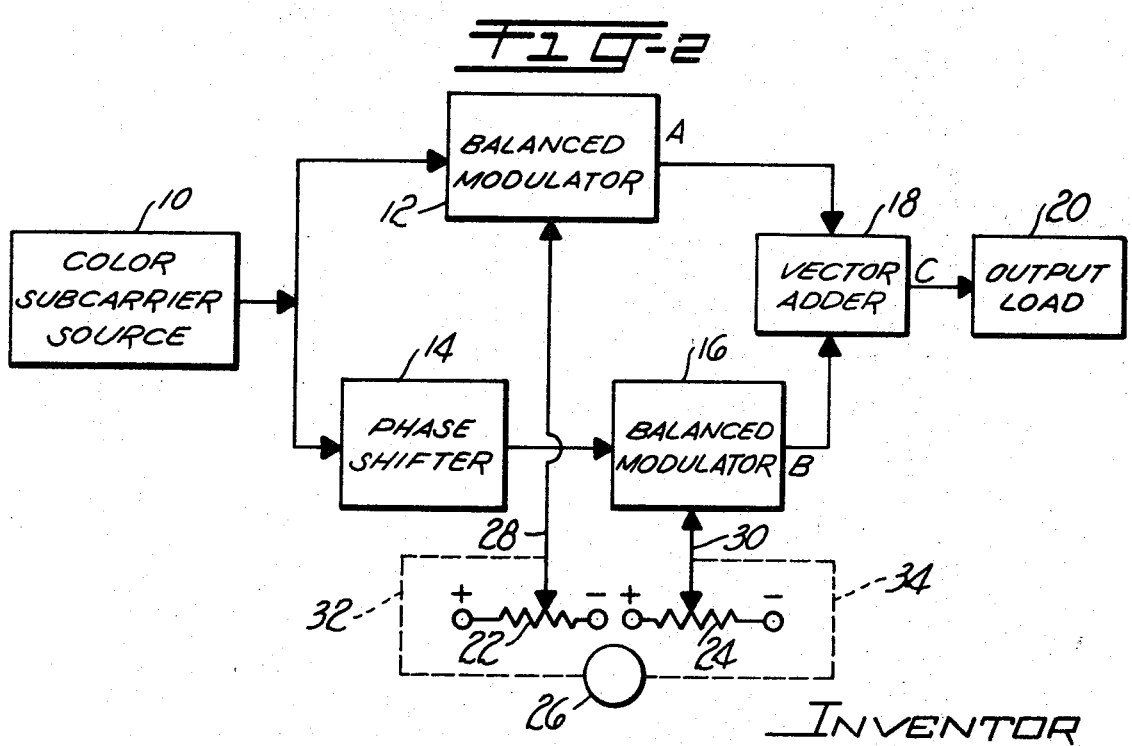

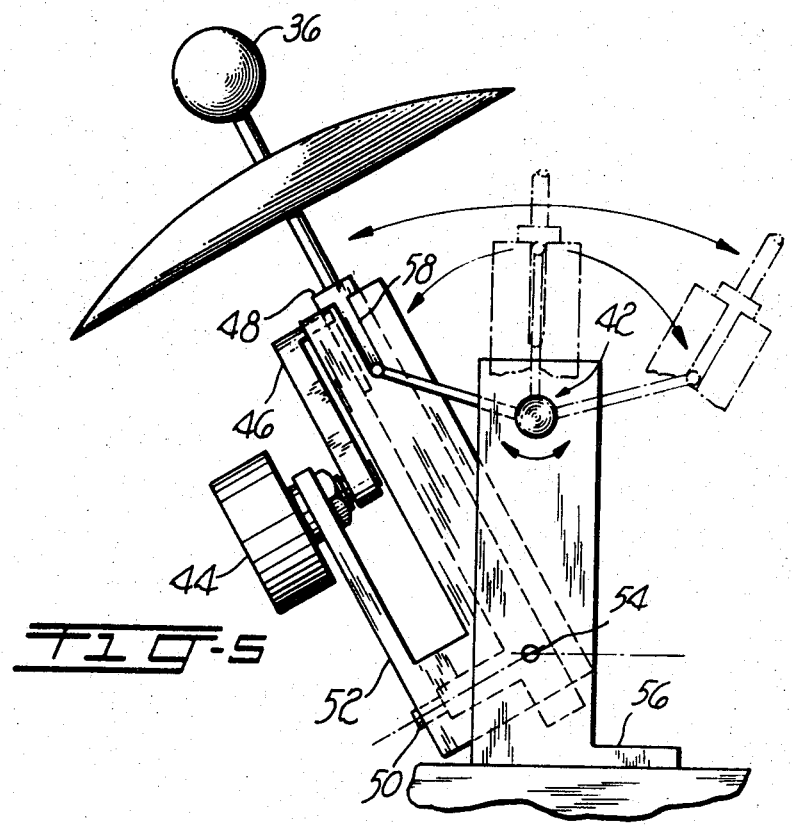
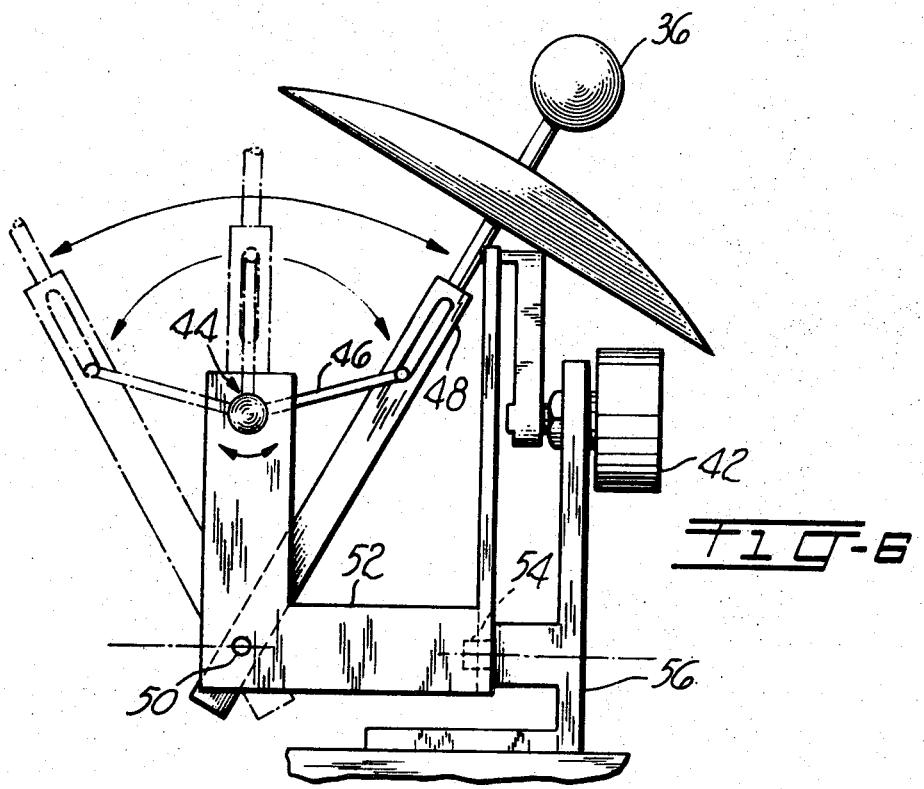

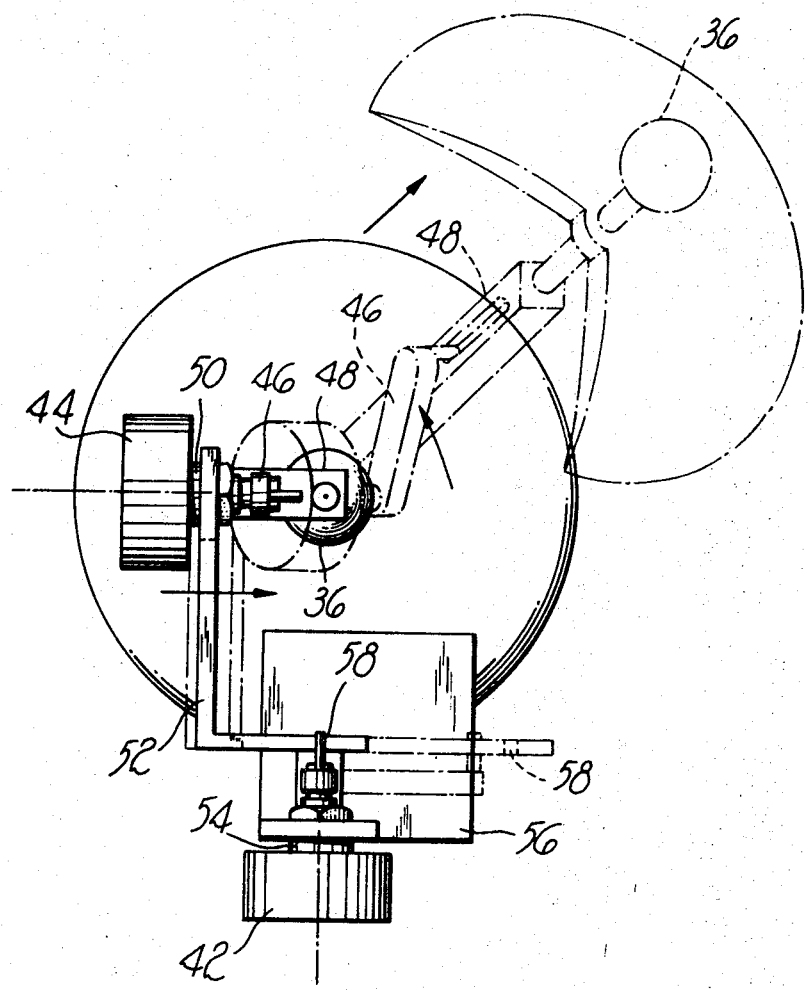

3,534,157
COMBINED HUE AND SATURATION CONTROL
Ole Skrydstrup, Pierrefonds, Quebec, Canada, assignor to Central Dynamics, Ltd., Montreal, Quebec, Canada, a body corporate
Filed Mar. 26, 1968, Ser. No. 716,212
Claims priority, application Canada, Mar. 30, 1967, 986,625
Int. Cl. H04n 9/02
U.S. Cl. 178—5.4                8 Claims

ABSTRACT OF THE DISCLOSURE

Apparatus and circuitry are disclosed for simultaneously controlling the saturation and hue of a chrominance signal. The circuitry includes a chrominance signal source, the signal being fed to two parallel paths, one of which includes a first balanced modulator and the other of which includes a 90 degree phase shift circuit in series with a second balanced modulator. The outputs of the modulators are vectorially added and applied to an appropriate output load, the signal at the load being the desired chrominance signal. The amplitude and phase of this signal which respectively correspond to the saturation and hue thereof are simultaneously controlled by a control means which includes a single lever which is capable of being moved in either a radial or angular direction or any combination thereof. Two potentiometers are respectively connected to the two balanced modulators, the output from each potentiometer controlling the amplitude and polarity of its associated balance modulator output. The two potentiometers are driven by and connected to the above mentioned lever by appropriate mechanical linkage whereby movement of the lever only in the radial direction causes only the amplitude of the signal applied to the load to vary in amplitude whereas only angular movement of the lever causes only the phase of the signal applied to the load to vary. By varying both the radial and angular position of the lever, any amplitude and phase of the signal applied to the load may be obtained and thus, of course, the saturation and hue of the chrominance signal may be varied at will.

BACKGROUND OF THE INVENTION

This invention relates to chrominance control circuitry and in particular to circuitry for varying the saturation and hue of the chrominance signal with a single lever.

One application of particular importance wherein the present invention is utilized arises in connection with special effects equipment used in television broadcasting stations. Such equipment produces, for example, colored titles using a monochrome keying source. In such applications, it is necessary to control the phase of the chrominance signal applied to the equipment to obtain the desired hue and to control the amplitude so as to obtain the desired color saturation. In prior art devices, two separate controls are provided to respectively control the phase and the amplitude of the chrominance signal. However, it can be readily seen that such an arrangement makes it extremely difficult for the operator to regulate the color (saturation and hue) of the chrominance signal when it is realized that a third parameter, luminance, must be controlled by a third control. Thus, since the operator has only two hands, the three controls of the prior art cannot, of course, be regulated simultaneously.

SUMMARY OF THE INVENTION

It is a primary object of this invention to provide chrominance signal control circuitry together with means for simultaneously regulating the hue and saturation thereof.

It is a further object of this invention to provide improved circuitry of the above type for facilitating the control of the three parameters of a color signal, that is its luminance, saturation and hue.

It is a further object of this invention to provide circuitry of the above type which is compatible with the PAL system for color television which has been proposed for Europe.

Other objects and advantages of this invention will become apparent upon reading the appended claims in conjunction with the following detailed description and the attached drawing.

BRIEF DESCRIPTION OF THE DRAWING

FIG. 1 is a block diagram illustrating a typical application of this invention.

FIG. 2 is a combined block and circuit diagram of an illustrative embodiment of the invention.

FIG. 5 is a front view of an illustrative embodiment of mechanical linkage which may be employed with the embodiment of FIG. 2.

FIGS. 6 and 7 are respective side and top views of the embodiment of FIG. 5.

DETAILED DESCRIPTION OF A PREFERRED EMBODIMENT OF THE INVENTION

Figure 3:
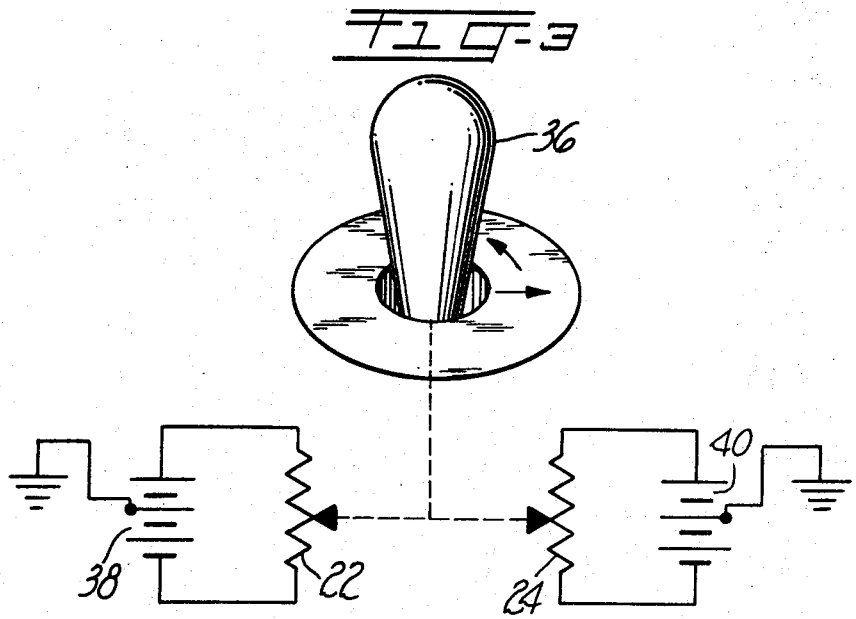
FIG. 3 diagrammatically illustrates a "joy stick" type of control which may be employed in the invention.

The description which follows, which is to be considered exemplary and not limitative, is based on the case where the invention is used as a source of encoded chrominance information forming an input to special effects equipment so that, for example, colored titles can be produced using a monochrome keying source. In such applications it is necessary to control the phase of the chrominance signal to obtain the desired hue and to control the amplitude of the chrominance signal to obtain the desired color saturation.

Referring to FIG. 1, a video signal source 11 feeds special effects equipment 15 and it is assumed that colored titles are to be inserted in the picture represented by the input signal. The titles are represented by the keying signal from a monochrome source 17. To add color to the titles, a color subcarrier or chrominance signal is applied to the special effects equipment 15 from source 10 via a control means 13 which includes the subject invention. FIG. 1 also shows a means of controlling luminance 19 so that the brightness of the colored titles may be adjusted. The output signal delivered to a load 21 contains the original picture information together with the colored title information.

Referring to FIG. 2, there is shown circuitry which corresponds to block 13 of FIG. 1. A color subcarrier or chrominance signal source 10 applies its output to a balanced modulator 12 and a phase shifter 14, which typically introduces a phase shift of —90° into the color subcarrier signal. The output of phase shifter 14 is applied to a balanced modulator 16 and the outputs of the modulators are vectorially added at an adder 18 and applied to an output load 20.

Potentiometer or first variable D.C. voltage source 22 and potentiometer or second D.C. voltage source 24 are respectively connected to the modulators 12 and 16, the reference outputs or D.C. signals of the potentiometers respectively amplitude modulating the quadrature components hereinafter respectively designated A and B on the drawing of the color subcarrier, which are combined in adder 18 to form the resultant modulated color subcarrier or chrominance signal (hereinafter called C). Control 26 regulates the position of the wipers 28 and 30 by appropriate mechanical linkage 32 and 34.

Referring to FIG. 3, there is diagrammatically shown a single lever or knob 36 sometimes known as a "joy stick," which controls wiper positions of potentiometers 22 and 24. Typically, movement of knob 36 in a radial direction controls both potentiometers 22 and 24 such that only the amplitude of output signal C varies while its phase remains constant. Angular movement of knob 36 at constant radius controls both potentiometers 22 and 24 such that only the phase of output signal C varies while its amplitude remains constant. Batteries 38 and 40 are respectively connected to potentiometers 22 and 24 so that both the amplitude and polarity of the signals A and B are controlled. Details of the mechanical linkage between the "joy stick" 36 and the potentiometers 22 and 24 are not considered part of this invention.

Figure 4A:
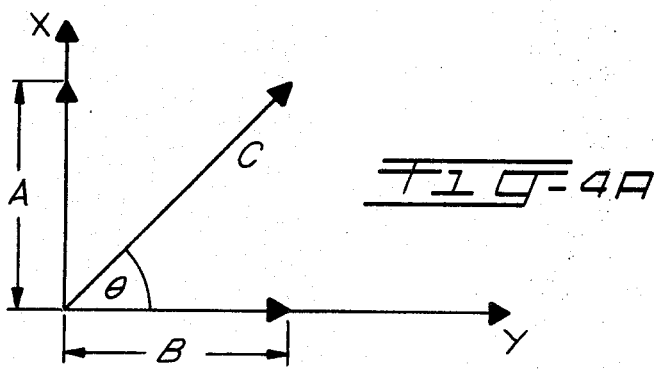
FIGS. 4A–4C are vector diagrams illustrating various modes of operation of the invention.
Figure 4B:
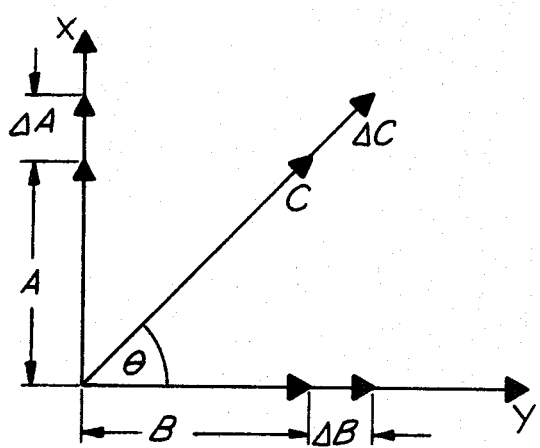

Referring to FIG. 4A, there is shown a vector diagram illustrating how the signals A and B are combined to form the resultant modulated color subcarrier signal C having a phase angle of Θ. As stated above, radial movement only of the knob 36 controls both potentiometers 22 and 24 such that only the amplitude of the output signal C is varied. This situation is illustrated in FIGS. 4B where the signal of FIG. 4A is shown with increased amplitude ΔC. To bring about ΔC, vectors A and B must undergo respective changes ΔA and ΔB, the ratio of ΔA and ΔB being the same as the ratio of A and B.

Figure 4C:
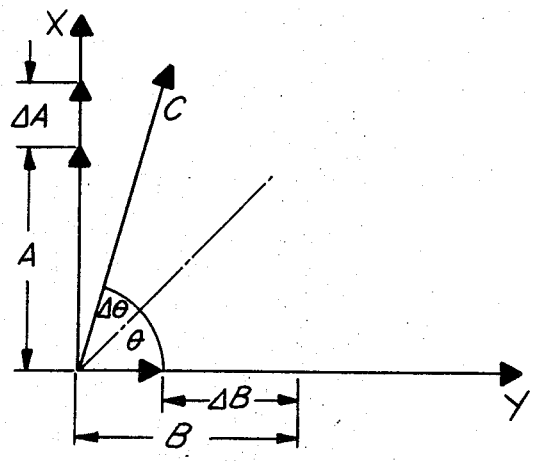

In FIG. 4C, there is shown a typical situation which results when the vector C of FIG. 4A undergoes a phase shift, its amplitude remaining constant. As stated above, this is effectuated whenever the knob 36 undergoes angular movement only. With a phase shift of ΔΘ, the vector A increases by ΔA while the vector B of FIG. 4A decreases by ΔB as shown in FIG. 4C.

Whenever the knob 36 undergoes combined radial and angular movement the effects illustrated in FIGS. 4B and and 4C both occur. The mechanical linkage 32 and 34 for effectuating the above described movements are matters well within the scope of those having ordinary skill in this art and as stated above, the linkage per se forms no part of the invention.

However, for the purpose of clarity, an illustrative mechanical linkage is illustrated with respect to FIGS. 5-7, which respectively correspond to front elevation, side elevation, and top plan views of linkage which may be used with the circuitry of FIG. 2. Although the operation of the linkage described with respect to FIGS. 5-7 is different in some particulars with respect to the linkage described relative to FIG. 2, it will be understood by those of ordinary skill in this art that the linkage of FIGS. 5-7 may readily be used with the FIG. 2 circuitry.

This linkage of FIGS. 5-7 controls two potentiometers, 44 and 42, from the positioning of the single control knob, 36, within a rectangular aperture. For the purpose of the description it is to be assumed that an axis XX runs parallel to the longest side of the linkage shown in FIGS. 5-7 and is centered within the aperture and that an axis YY runs parallel to the short side and is centered within the aperture, and the control knob, 36, is centered at the intersection of these axes.

Linear movement of the control knob, 36, along the axis XX or parallel to the axis XX, is directly converted into angular rotation of the arm of the potentiometer, 42. Similarly, any linear movement of the control knob, 36, along the axis YY or parallel to the axis YY is directly converted into angular rotation of the arm of the potentiometer, 44. The potentiometers, 44 and 42, are mounted independent of one another and each is driven to correspond to the linear displacement of the control knob, 36, with respect to the intersection of the X and Y axis. Therefore random positioning of the control knob, 36, within the aperture, is translated into direct linear displacement measured parallel to the X and Y axis. The spindle (not shown) of the potentiometer, 44, is driven by the potentiometer arm, 46, on the end of which a pin engages into a slot on the control lever, 48, on the end of which the control knob, 36, is fixed. The control lever, 48, is pivoted on the bearing stub, 50, the axis of which is parallel to the spindle of 44. This bearing stub forms part of the gimble bracket 52, on to which the potentiometer 44 is mounted. The gimble bracket, 52, is pivoted on the bearing stub, 54, the axis of which is at 90° to the spindle of 44, and intersects the axis of the control lever, 48. This bearing stub forms part of the fixed bracket, 56, on to which the potentiometer 42 is mounted with its spindle parallel to the axis of the bearing stub, 54. The spindle of the potentiometer 42 is driven by the potentiometer arm, 56, which engages, via a pin, into the slot, 58, of the gimble bracket, 52.

When the linkage is used to control hue and saturation of a chroma signal, the aperture must be circularly shaped in order to maintain the correct relationship, required by the NTSC Colour System, between R-Y and B-Y information. This does however not change in any respect the principle of the operation of the joystick.

The color subcarrier modulator described hereinbefore has been employed in the television art; however, the combination of the modulator with a single control lever such as knob 36 is considered novel and results in greatly improved capability in regulating the color of the titles which may be inserted into a color television picture. Further, the present invention is compatible with the PAL system for color television which has been proposed in Europe, while the approaches of the prior art are not.

Numerous modifications of the invention will become apparent to one of ordinary skill in the art upon reading the foregoing disclosure. During such a reading it will be evident that this invention provides unique circuitry for accomplishing the objects and advantages herein stated. Still other objects and advantages and even further modifications will become apparent from this disclosure. It is to be understood, however, that the foregoing disclosure is to be considered exemplary and not limitative, the scope of the invention being defined by the following claims.

What is claimed is:

1. Apparatus and circuitry for simultaneously regulating the amplitude and phase of a chrominance signal to thereby respectively regulate the saturation and hue thereof, said circuitry comprising:
   means responsive to said chrominance signal for developing quadrature components thereof;
   means for providing first and second variable reference signals of positive or negative polarity;
   means for respectively amplitude modulating said quadrature components with said first and second reference signals;
   means for vectorially adding the amplitude modulated quadrature components for producing a resultant chrominance signal; and
   control means including a single lever capable of movement in either or both of two orthogonal directions and including means connecting said lever to the first and second variable reference signal sources for simultaneously regulating said first and second reference signals, movement of said lever only in one of said two directions causing only the amplitude of said resultant chrominance signal to change and movement of said lever only in the other of said two directions causing only the phase of said resultant chrominance signal to change and movement of said lever in both of said directions causing both the amplitude and phase to change whereby the desired amplitude and phase of the chrominance signal may be obtained.

2. Apparatus and circuitry as in claim 1 where said one direction is a radial line with respect to a central point and its other direction is along a circular line concentric with respect to said central point.

3. Apparatus and circuitry as in claim 2 where said amplitude modulating means includes a pair of balanced modulators respectively corresponding to said quadrature components.

4. Apparatus and circuitry as in claim 3 where said first and second variable reference source includes first and second potentiometers respectively connected to said balanced modulators.

5. Apparatus and circuitry for simultaneously regulating the amplitude and phase of a chrominance signal to thereby respectively regulate the saturation and hue thereof, said circuitry comprising:

means for providing a first variable reference signal of positive or negative polarity;

first amplitude modulating means responsive to said chrominance signal and said first variable reference signal for providing a first quadrature component the amplitude and polarity of which are a function of the amplitude and polarity, respectively, of said reference signal;

means for shifting the phase of said chrominance signal 90° with respect to the signal applied to the first balance modulator;

means for providing a second variable reference signal of positive or negative polarity;

second amplitude modulating means responsive to the phase shifted chrominance signal and said second variable reference signal for providing a second quadrature component, the amplitude and polarity of which respectively correspond to the amplitude and polarity of said second reference signal;

means for vectorially adding said first and second quadrature components for producing a resultant chrominance signal having the desired amplitude and phase; and control means including a single control lever capable of movement in either or both of two orthogonal directions and including means connecting said lever to the first and second variable reference signal sources for simultaneously regulating the respective amplitudes and polarities of said first and second reference signals, movement of said lever only in one of said two directions causing only the amplitude of said resultant chrominance signal to change and movement of said lever only in the other of said two directions causing only the phase of said resultant chrominance signal to change and the movement of said lever in both of said directions causing both the amplitude and phase to change.

6. Apparatus and circuitry as in claim 5 where said one direction is a radial line with respect to a central point and its other direction is along a circular line concentric with respect to said central point.

7. Apparatus and circuitry as in claim 6 where both said first and second modulating means are balanced modulators.

8. Apparatus and circuitry as in claim 7 where said phase shifting means phase shifts said chrominance signal —90°.

References Cited

UNITED STATES PATENTS

| | | | |
|---|---|---|---|
| 2,866,124 | 12/1958 | Giuffrida et al. | 178—5.4 |
| 2,877,293 | 3/1959 | Loughren | 178—5.4 |
| 2,881,245 | 4/1959 | Fenton et al. | 178—5.4 |
| 3,374,310 | 3/1968 | Beers | 178—5.4 |

RICHARD MURRAY, Primary Examiner